Figure 1:
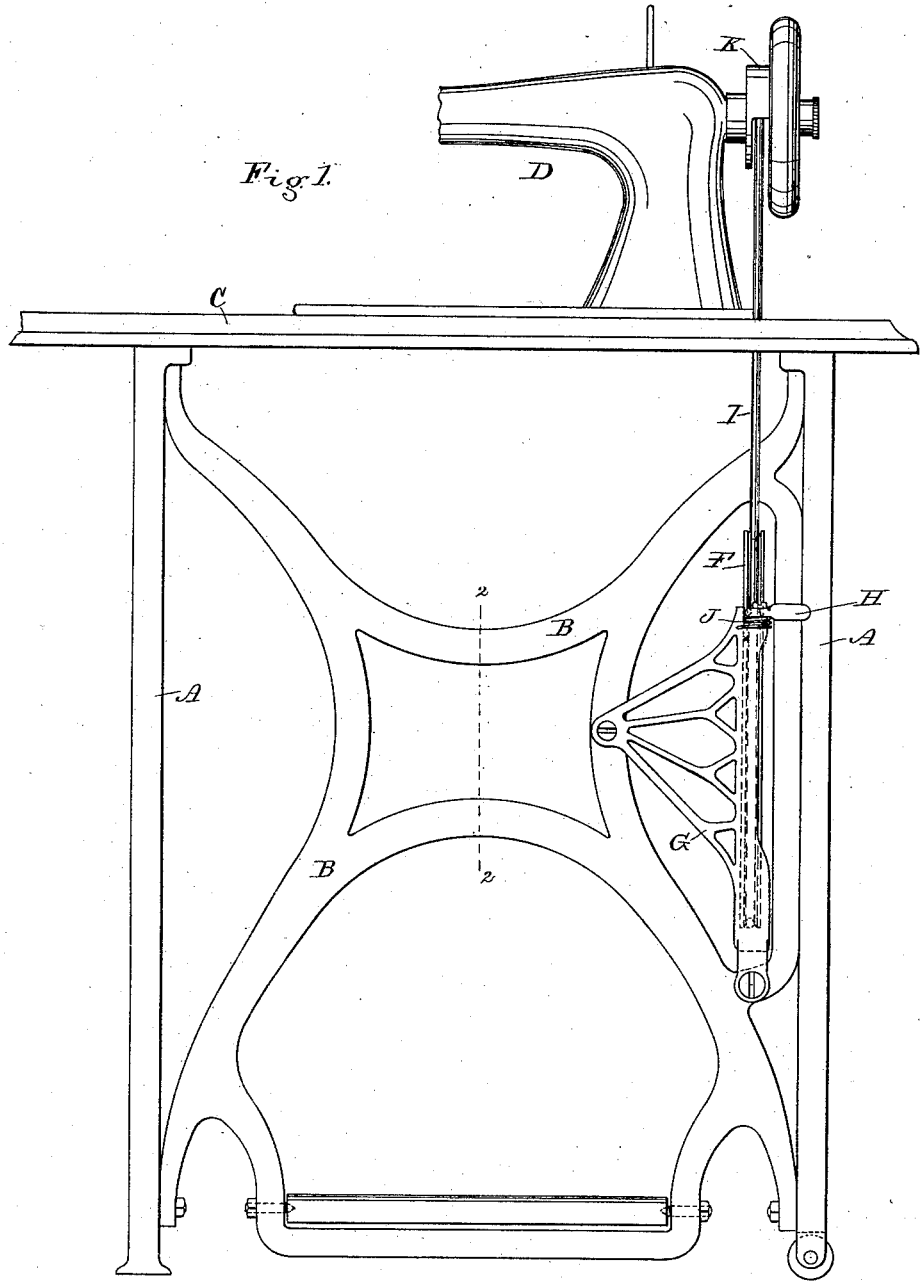

(No Model.)

2 Sheets—Sheet 1.

P. DIEHL.
BELT SHIFTING AND REPLACING DEVICE.

No. 313,999. Patented Mar. 17, 1885.

WITNESSES:

INVENTOR
Philip Diehl,
BY
Henry Calver,
ATTORNEY

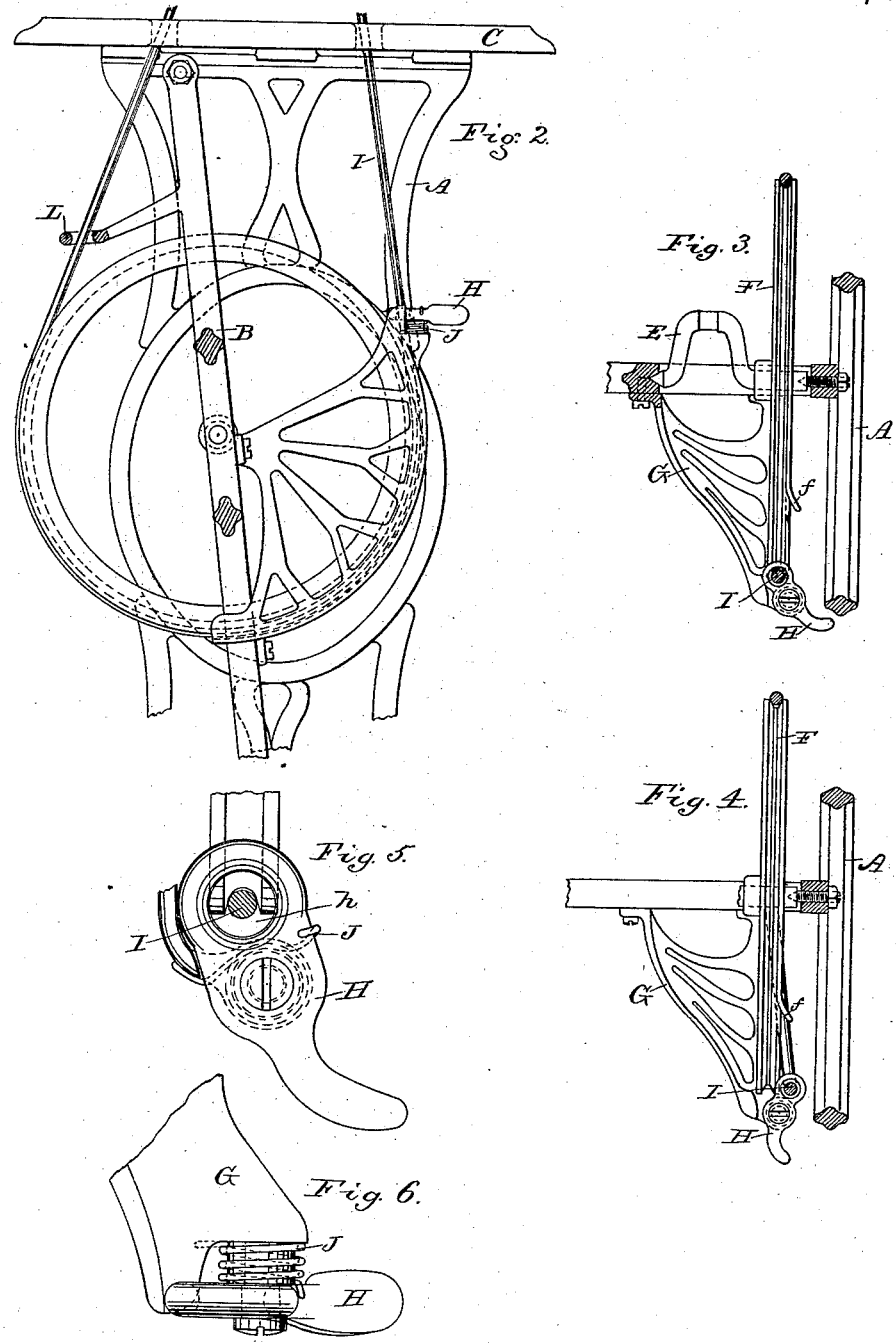

United States Patent Office.

PHILIP DIEHL, OF ELIZABETH, NEW JERSEY, ASSIGNOR TO THE SINGER MANUFACTURING COMPANY OF NEW JERSEY.

BELT SHIFTING AND REPLACING DEVICE.

SPECIFICATION forming part of Letters Patent No. 313,999, dated March 17, 1885.

Application filed January 31, 1885. (No model.)

*To all whom it may concern:*

Be it known that I, PHILIP DIEHL, a citizen of the United States, residing at Elizabeth, in the county of Union and State of New Jersey, have invented certain new and useful Improvements in Belt Shifting and Replacing Devices, of which the following is a specification, reference being had therein to the accompanying drawings.

The object of my invention is to provide a convenient and cheaply-constructed belt-shifting device, by which a belt, after having been shifted by said device from its pulley, will be automatically replaced in operative position when the shifting-lever is released by the operator.

In carrying my invention into effect, I construct a shifting-lever with an opening through which the belt may pass, and provide a retracting-spring by which said lever is returned to its normal position after the belt has been shifted from the pulley.

In applying my invention to sewing-machines, for which it is more particularly intended, I prefer to pivot the shifting-lever to the top of the dress-guard which partly surrounds the lower pulley-wheel, and I also deem it well to provide said wheel with an inclined belt-replacing lip or projection to assist the shifter in automatically replacing the belt. When the belt is new and stiff, a guard over the upper pulley on the driving-shaft of the machine is useful in preventing the belt from getting displaced, and a guide for the belt on the rear side of the cross-brace of the stand is also a useful adjunct in holding the belt in place. These several co-operative features of my invention are not, however, indispensable, and may be used or not, as circumstances may require.

In the accompanying drawings, Figure 1 is an elevation of a sewing-machine with my invention applied thereto. Fig. 2 is a partial side view with the cross-brace of the stand in section on line 2 2, Fig. 1. Figs. 3 and 4 are top views of the main pulley and adjacent parts, showing the shifter in different positions. Figs. 5 and 6 are detail top and side views, respectively, of the shifter and adjacent parts.

A indicates the side supports of a sewing-machine stand; B, the cross-brace thereof, and C the table on which is mounted the "head" or sewing-machine proper D.

In the stand is mounted a crank-shaft, E, to which is secured the main driving-pulley F, and partly surrounding the latter on its front side is a dress-guard, G, to the top of which I prefer to pivot my belt-shifting lever H, although I do not wish to be understood as limiting myself to the particular location thereof, as it may be placed in any convenient position. The lever H is provided with an opening, $h$, through which the belt I loosely passes, and a spring, J, connected with said lever and with some fixed part of the stand, as the top of the dress-guard, serves to hold the lever in position for the belt when on the pulley to pass through it. The opening $h$ in the lever H is preferably inclosed, as shown, so as to hold the belt positively at all times; but it is obvious that said lever may simply be forked for the passage of the belt, if desired. When the belts are new and stiff, they are liable when off the driving-pulleys and released from tension to become displaced unless held positively, and to this end I prefer to cover the upper pulley on the driving-shaft of the machine with a guard, K, and as an additional means for holding the belt in place at all times a guide, L, attached to the rear side of the cross-brace or some other part of the stand, may also be used.

From the foregoing it will be understood that the spring J will normally hold the shifting-lever H in the position shown in Figs. 3 and 5; but when the belt is to be thrown from the driving-pulley F, the operator will move the shifter to the position indicated in Fig. 4, and the belt will then instantly run off from the pulley. When the shifting-lever is released by the operator, it is immediately returned to its original position by its retracting and holding spring J, and the belt is thus held in place to be run onto the pulley when the latter is rotated. To insure this automatic action, I prefer to provide said pulley with an inclined belt-replacing device or projection, $f$, which will engage the belt when the pulley is rotated in the proper direction and cause the former to run onto the latter.

I claim as my invention—

1. The combination, with a pulley-wheel, of a belt-shifter placed adjacent thereto and having an opening for the passage of the belt, and a spring connected with said shifter and adapted to hold the same in position for the belt to run on the said pulley and to return or retract said shifter to such position after it has been moved to shift the belt from the pulley, substantially as set forth.

2. A spring-retracted belt-shifter having an inclosed opening for the passage of the belt, substantially as set forth.

3. The combination, with a sewing-machine stand, of a spring-retracted belt-shifter, substantially as set forth.

4. The combination, with the dress-guard of a sewing-machine stand, of a belt-shifting lever pivoted thereto, substantially as set forth.

5. The combination, with the dress-guard of a sewing-machine stand, of a spring-retracted belt-shifter pivoted to the top thereof, substantially as set forth.

6. The combination, with a pulley provided with a belt-replacer, of a spring-retracted belt-shifter, substantially as set forth.

7. The combination, with the main or lower driving-pulley and the belt-shifter, of a belt-guard for covering the upper pulley, substantially as set forth.

8. The combination, with the stand, the belt-shifter placed at the front side thereof, and the main driving-pulley, of a belt-guide on the rear side of said stand, substantially as set forth.

In testimony whereof I affix my signature in presence of two witnesses.

PHILIP DIEHL.

Witnesses:
JAMES REID,
WM. W. COVELL.